United States Patent
Hori et al.

(10) Patent No.: US 10,718,377 B2
(45) Date of Patent: Jul. 21, 2020

(54) METHOD FOR PRODUCING BEARING RING, DOUBLE ROW TAPERED ROLLER BEARING, AND METHOD FOR PRODUCING DOUBLE ROW TAPERED ROLLER BEARING

(71) Applicant: NTN CORPORATION, Osaka-shi, Osaka (JP)

(72) Inventors: Michio Hori, Mie (JP); Hideto Torisawa, Mie (JP); Hiroshi Yuki, Mie (JP); Chikara Ohki, Mie (JP); Kazuhiro Yagita, Mie (JP)

(73) Assignee: NTN CORPORATION, Osaka (JP)

( * ) Notice: Subject to any disclaimer, the term of this patent is extended or adjusted under 35 U.S.C. 154(b) by 0 days.

(21) Appl. No.: 15/771,763

(22) PCT Filed: Oct. 12, 2016

(86) PCT No.: PCT/JP2016/080236
§ 371 (c)(1),
(2) Date: Apr. 27, 2018

(87) PCT Pub. No.: WO2017/073325
PCT Pub. Date: May 4, 2017

(65) Prior Publication Data
US 2018/0347623 A1    Dec. 6, 2018

(30) Foreign Application Priority Data

Oct. 29, 2015 (JP) .................................. 2015-213089
Oct. 29, 2015 (JP) .................................. 2015-213091

(51) Int. Cl.
*F16C 19/38* (2006.01)
*C21D 9/40* (2006.01)
(Continued)

(52) U.S. Cl.
CPC .............. *F16C 19/385* (2013.01); *C21D 1/10* (2013.01); *C21D 1/18* (2013.01); *C21D 1/28* (2013.01);
(Continued)

(58) Field of Classification Search
CPC ........ F16C 19/38; F16C 19/385; F16C 33/62; F16C 33/64; F16C 43/04; F16C 33/585;
(Continued)

(56) References Cited

U.S. PATENT DOCUMENTS 1,527,418 A * 2/1925 Laughlin ................... C21D 9/34
134/123
2,016,923 A * 10/1935 Herrmann ............... F16C 33/60
384/564
(Continued)

FOREIGN PATENT DOCUMENTS

CN    102471820 A    5/2012
CN    103890201 A    6/2014
(Continued)

OTHER PUBLICATIONS

International Search Report issued in Application No. PCT/JP2016/080236 dated Dec. 20, 2016, with English translation.
(Continued)

*Primary Examiner* — Marcus Charles
(74) *Attorney, Agent, or Firm* — McDermott Will & Emery LLP

(57) ABSTRACT

There is prepared a formed body constituted of steel and having an outer circumferential surface having an annular groove having a bottom surface to serve as a raceway surface of the bearing ring. In the step of forming a heated region, the formed body is induction heated to form a heated region including the bottom surface of the groove and heated to a temperature of at least an $A_1$ point. In the cooling step,
(Continued)

the whole of the heated region is simultaneously cooled to a temperature of not more than an $M_s$ point. The step of retaining the formed body in a state in which heating is stopped is performed after the step of forming a heated region before the step of cooling. In the step of retaining, dispersion in temperature in the heated region in the circumferential direction is suppressed to not more than 20° C.

4 Claims, 10 Drawing Sheets

(51) Int. Cl.

| | | |
|---|---|---|
| C21D 1/42 | (2006.01) | |
| C22C 38/22 | (2006.01) | |
| C21D 6/00 | (2006.01) | |
| C22C 38/04 | (2006.01) | |
| C21D 1/10 | (2006.01) | |
| C22C 38/02 | (2006.01) | |
| C21D 1/28 | (2006.01) | |
| F16C 33/62 | (2006.01) | |
| F16C 33/64 | (2006.01) | |
| C22C 38/44 | (2006.01) | |
| C22C 38/00 | (2006.01) | |
| C21D 1/18 | (2006.01) | |
| F16C 37/00 | (2006.01) | |
| F16C 33/58 | (2006.01) | |
| C22C 38/12 | (2006.01) | |
| C22C 38/08 | (2006.01) | |

(52) U.S. Cl.
CPC ............. *C21D 1/42* (2013.01); *C21D 6/002* (2013.01); *C21D 6/005* (2013.01); *C21D 6/008* (2013.01); *C21D 9/40* (2013.01); *C22C 38/00* (2013.01); *C22C 38/02* (2013.01); *C22C 38/04* (2013.01); *C22C 38/22* (2013.01); *C22C 38/44* (2013.01); *F16C 19/386* (2013.01); *F16C 33/585* (2013.01); *F16C 33/64* (2013.01); *F16C 37/007* (2013.01); *C21D 2221/00* (2013.01); *C22C 38/08* (2013.01); *C22C 38/12* (2013.01); *F16C 33/62* (2013.01); *F16C 2223/18* (2013.01); *F16C 2300/14* (2013.01); *F16C 2360/31* (2013.01); *Y02P 10/253* (2015.11)

(58) Field of Classification Search
CPC ............. F16C 2240/30; F16C 2204/04; F16C 2300/14; F16C 2360/31; C21D 1/10; C21D 1/28; C21D 6/005; C21D 6/008; C21D 9/40; C21D 2221/10; C21D 8/1244; C21C 6/002; C22C 38/00; C22D 38/02; C22D 38/04; C22D 38/22; C22D 38/44; Y02P 10/253; H05K 6/10; H05K 6/36; H02K 6/44
USPC ............... 384/456, 492, 570, 571, 625; 29/898.066; 148/320, 504, 511, 567, 644, 148/906
See application file for complete search history.

(56) References Cited

U.S. PATENT DOCUMENTS

| | | | | |
|---|---|---|---|---|
| 5,085,733 A | * | 2/1992 | Mitamura ............... | C22C 38/18 148/319 |
| 6,030,471 A | * | 2/2000 | Coles ..................... | C21D 1/10 148/574 |
| 6,280,093 B1 | * | 8/2001 | Ohtsuki ................ | B60B 27/00 384/448 |
| 6,296,721 B1 | * | 10/2001 | Coles ..................... | C21D 1/10 148/320 |
| 2003/0127161 A1 | * | 7/2003 | Burrier, Jr. .............. | C21D 1/06 148/539 |
| 2005/0185871 A1 | * | 8/2005 | Morita ................... | B60B 27/00 384/544 |
| 2006/0213588 A1 | * | 9/2006 | Fujita ...................... | C21D 1/10 148/511 |
| 2007/0127858 A1 | * | 6/2007 | Nakagawa ............ | F16C 19/505 384/495 |
| 2008/0073003 A1 | * | 3/2008 | Fujita ..................... | C21D 1/00 148/500 |
| 2008/0141535 A1 | * | 6/2008 | Rollmann ............... | C21D 1/10 29/898.066 |
| 2009/0220180 A1 | * | 9/2009 | Ohtsuki ............. | B60B 27/0005 384/512 |
| 2010/0154937 A1 | * | 6/2010 | Ohki ...................... | C21D 1/06 148/215 |
| 2010/0264134 A1 | * | 10/2010 | Peterson ................ | B23K 1/002 219/675 |
| 2011/0135240 A1 | * | 6/2011 | Hirai .................. | B60B 27/0005 384/589 |
| 2011/0311362 A1 | * | 12/2011 | Corts ..................... | F16C 33/60 416/174 |
| 2012/0121420 A1 | * | 5/2012 | Yuki ....................... | C21D 1/10 416/174 |
| 2013/0251298 A1 | * | 9/2013 | Gegner .................. | C21D 9/40 384/570 |
| 2013/0301969 A1 | * | 11/2013 | Yuki ....................... | C21D 1/10 384/462 |
| 2014/0305552 A1 | * | 10/2014 | Ohki ...................... | C21D 9/40 148/570 |
| 2014/0321789 A1 | | 10/2014 | Sato et al. | |
| 2016/0376678 A1 | * | 12/2016 | Wagner .................. | C21D 9/40 148/575 |

FOREIGN PATENT DOCUMENTS

| | | | | |
|---|---|---|---|---|
| CN | 103975081 A | | 8/2014 | |
| DE | 102011122145 A1 | * | 6/2013 | ............. C21D 9/40 |
| DE | 102015201644 A1 | * | 8/2016 | ............. B23P 9/02 |
| EP | 1321312 A2 | * | 6/2003 | ............. B60B 27/00 |
| EP | 2458023 A1 | | 5/2012 | |
| EP | 2495466 A1 | * | 9/2012 | ............. C21D 9/40 |
| JP | S51-110142 U | | 9/1976 | |
| JP | 2005325409 A | * | 11/2005 | ............. C21D 9/40 |
| JP | 2007-009951 A | | 1/2007 | |
| JP | 2007-024294 A | | 2/2007 | |
| JP | 2008032673 A | * | 2/2008 | ............. F16C 33/62 |
| JP | 2008-546948 A | | 12/2008 | |
| JP | 2011117016 A | | 6/2011 | |
| JP | 2013124416 A | * | 6/2013 | ............. C21D 9/40 |
| JP | 2013216959 A | * | 10/2013 | ............. C21D 9/40 |
| JP | 2014041789 A | * | 3/2014 | ............. F16C 33/64 |
| WO | 2007/119953 A1 | | 10/2007 | |
| WO | 2011/010664 A1 | | 1/2011 | |

OTHER PUBLICATIONS

Office Action issued in corresponding Chinese Application No. 201680062844.6, dated May 8, 2019, w/ English translation.
Extended European search report issued in corresponding European Application No. 16859561.9, dated May 17, 2019.

* cited by examiner

METHOD FOR PRODUCING BEARING RING, DOUBLE ROW TAPERED ROLLER BEARING, AND METHOD FOR PRODUCING DOUBLE ROW TAPERED ROLLER BEARING

RELATED APPLICATIONS

This application is a national stage of International Application No. PCT/JP2016/080236, filed Oct. 12, 2016, which claims the benefit of Japanese Application No. 2015-213089, filed on Oct. 29, 2015, and Application No. 2015-213091, filed Oct. 29, 2015, the disclosures of which are incorporated in their entirety by reference herein.

TECHNICAL FIELD

The present invention relates to a method for producing a bearing ring, a double row tapered roller bearing, and a method for producing the double row tapered roller bearing.

BACKGROUND ART

A bearing for a wind turbine generator, such as a main shaft bearing that supports a shaft transmitting a blade's rotational power, is acted on not only by a load component attributed to the weight of the blade and that of a rotor but also by a load component attributed to a wind load. That is, in addition to a radial load, an axial load also acts on the bearing. For this reason, it has been conventionally proposed to use a double row tapered roller bearing as a bearing for a wind power generator (see, for example, Japanese Patent National Publication No. 2008-546948).

CITATION LIST

Patent Document

PTD 1: Japanese Patent National Publication No. 2008-546948

SUMMARY OF INVENTION

Technical Problem

As disclosed in Japanese Patent National Publication No. 2008-546948, a double row tapered roller bearing applied to a wind power generator has an outer ring with a plurality of bolt holes, and is secured to a housing of the wind power generator by bolts inserted through the bolt holes. Bolt holes may similarly be formed for an inner ring of the double row tapered roller bearing.

For such a double row tapered roller bearing's outer and inner rings, there is adopted a process of carburizing and quenching using carburizing steel in order to obtain required hardness. This is based on the following reason:

A plurality of bolt holes formed in an outer ring or the like as described above are required to have a high positional accuracy in order to accurately fix the double row tapered roller bearing to neighboring parts. Accordingly, forming the bolt holes after a heat treatment for the outer ring or the like is completed can eliminate the necessity of considering such deformation of the outer ring accompanying the heat treatment as in a case of forming the bolt holes before the heat treatment, and can also contribute to enhanced working efficiency. On the other hand, the outer ring or the like increased in hardness by the heat treatment is impaired in machinability and accordingly, difficult to machine. That is, using a bearing steel as a material for an outer ring and the like and performing general, entire quenching as a heat treatment make working bolt holes difficult.

Accordingly, when carburizing steel is used as a material for an outer ring and the like and carburized and quenched in a state in which an anti-carburization treatment has been applied to a region in which bolt holes should be formed, a region without the anti-carburization treatment can be enhanced in hardness, whereas the region having undergone the anti-carburization treatment is prevented from being increased in hardness, and accordingly, a process for forming bolt holes after the carburizing and quenching can be easily performed.

However, if such a carburizing heating process as described above is performed, the number of steps including the anti-carburization treatment is increased to be larger than a typical quenching process, and the heating process's own processing time is also longer than general, entire quenching, resulting in an increased production cost.

The present invention has been made to address the above issue, and contemplates a double row tapered roller bearing produced at reduced cost.

Solution To Problem

A method for producing a bearing ring according to the present disclosure is a method for producing a bearing ring of a double row tapered roller bearing, comprising the steps of: preparing a formed body; forming a heated region; retaining the formed body in a state in which heating is stopped; and cooing. In the step of preparing a formed body, there is prepared a formed body constituted of steel and having an outer circumferential surface having an annular groove having a bottom surface to serve as a raceway surface of the bearing ring. In the step of forming a heated region, the formed body is induction heated to form a heated region including the bottom surface of the groove and heated to a temperature of at least an $A_1$ point. In the cooling step, the whole of the heated region is simultaneously cooled to a temperature of not more than an $M_s$ point. The step of retaining the formed body in a state in which heating is stopped is performed after the step of forming a heated region before the step of cooling. In the step of retaining, dispersion in temperature in the heated region in the circumferential direction is suppressed to not more than 20° C.

A method for producing a double row tapered roller bearing according to the present disclosure includes the steps of: preparing a bearing ring; preparing tapered rollers; and assembling a double row tapered roller bearing by combining the bearing ring and the rollers. The bearing ring is produced in the method for producing a bearing ring as described above.

A method for producing a bearing ring according to the present disclosure is a method for producing a bearing ring of a double row tapered roller bearing, comprising the steps of: preparing a formed body; forming a heated region; retaining the formed body in a state in which heating is stopped; and cooing. In the step of preparing a formed body, a formed body is prepared which is constituted of steel containing at least 0.43 mass % and not more than 0.65 mass % of carbon, at least 0.15 mass % and not more than 0.35 mass % of silicon, at least 0.60 mass % and not more than 1.10 mass % of manganese, at least 0.30 mass % and not more than 1.20 mass % of chromium, and at least 0.15 mass % and not more than 0.75 mass % of molybdenum with the rest consisting of iron and an impurity, and has an outer circumferential surface having an annular groove having a bottom surface to serve as a raceway surface of the bearing ring. In the step of forming a heated region, the formed body is induction heated to form a heated region including the bottom surface of the groove and heated to a temperature of at least an $A_1$ point. In the cooling step, the whole of the heated region is simultaneously cooled to a temperature of not more than an $M_s$ point. The step of retaining the formed body in a state in which heating is stopped is performed after the step of forming a heated region before the step of cooling. In the step of retaining, dispersion in temperature in the heated region in the circumferential direction is suppressed to not more than 20° C.

A method for producing a bearing ring according to the present disclosure is a method for producing a bearing ring of a double row tapered roller bearing, comprising the steps of: preparing a formed body; forming a heated region; retaining the formed body in a state in which heating is stopped; and cooing. In the step of preparing a formed body, a formed body is prepared which is constituted of steel containing at least 0.43 mass % and not more than 0.65 mass % of carbon, at least 0.15 mass % and not more than 0.35 mass % of silicon, at least 0.60 mass % and not more than 1.10 mass % of manganese, at least 0.30 mass % and not more than 1.20 mass % of chromium, at least 0.15 mass % and not more than 0.75 mass % of molybdenum, and at least 0.35 mass % and not more than 0.75 mass % of nickel with the rest consisting of iron and an impurity, and has an outer circumferential surface having an annular groove having a bottom surface to serve as a raceway surface of the bearing ring. In the step of forming a heated region, the formed body is induction heated to form a heated region including the bottom surface of the groove and heated to a temperature of at least an $A_1$ point. In the cooling step, the whole of the heated region is simultaneously cooled to a temperature of not more than an $M_s$ point. The step of retaining the formed body in a state in which heating is stopped is performed after the step of forming a heated region before the step of cooling. In the step of retaining, dispersion in temperature in the heated region in the circumferential direction is suppressed to not more than 20° C.

A double row tapered roller bearing according to the present disclosure comprises: an outer ring serving as a bearing ring having an annular shape; an inner ring disposed on an inner circumferential side of the outer ring and serving as a bearing ring having an annular shape; and rollers. The inner ring has an outer circumferential surface facing the outer ring and having two rows of grooves having a bottom surface serving as a raceway surface. The rollers are tapered rollers disposed in the grooves in contact with the raceway surface of the inner ring and are also in contact with the outer ring. At the outer circumferential surface of the inner ring, a region adjacent to the groove includes a hardened region extending from an inner peripheral surface of the groove to the region adjacent to the groove, and an unhardened region located at a position farther from the groove than the hardened region and being smaller in hardness than the hardened region. The inner ring is constituted of steel containing at least 0.43 mass % and not more than 0.65 mass % of carbon, at least 0.15 mass % and not more than 0.35 mass % of silicon, at least 0.60 mass % and not more than 1.10 mass % of manganese, at least 0.30 mass % and not more than 1.20 mass % of chromium, at least 0.15 mass % and not more than 0.75 mass % of molybdenum, with the rest consisting of iron and an impurity.

A double row tapered roller bearing according to the present disclosure comprises: an outer ring serving as a bearing ring having an annular shape; an inner ring disposed on an inner circumferential side of the outer ring and serving as a bearing ring having an annular shape; and rollers. The inner ring has an outer circumferential surface facing the outer ring and having two rows of grooves having a bottom surface serving as a raceway surface. The rollers are tapered rollers disposed in the grooves in contact with the raceway surface of the inner ring and are also in contact with the outer ring. At the outer circumferential surface of the inner ring, a region adjacent to the groove includes a hardened region extending from an inner peripheral surface of the groove to the region adjacent to the groove, and an unhardened region located at a position farther from the groove than the hardened region and being smaller in hardness than the hardened region. The inner ring is constituted of steel containing at least 0.43 mass % and not more than 0.65 mass % of carbon, at least 0.15 mass % and not more than 0.35 mass % of silicon, at least 0.60 mass % and not more than 1.10 mass % of manganese, at least 0.30 mass % and not more than 1.20 mass % of chromium, at least 0.15 mass % and not more than 0.75 mass % of molybdenum, and at least 0.35 mass % and not more than 0.75 mass % of nickel with the rest consisting of iron and an impurity.

Advantageous Effects Of Invention

Thus a double row tapered roller bearing can be obtained that comprises a bearing ring having sufficient characteristics without inviting an increased production cost.

DESCRIPTION OF EMBODIMENTS

Embodiments of the present invention are now described with reference to the drawings. In the figures, identical or corresponding components are identically denoted and will not be described redundantly.

First Embodiment

<Configuration of Double Row Tapered Roller Bearing>

A structure of a double row tapered roller bearing according to a first embodiment will be described with reference to FIGS. 1 and 2.

Figure 1:
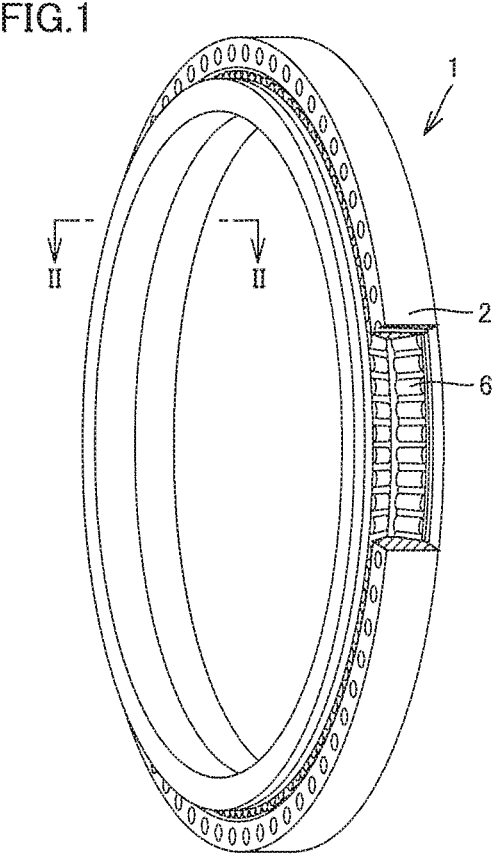
FIG. 1 is a schematic view of a double row tapered roller bearing according to a first embodiment.
Figure 2:
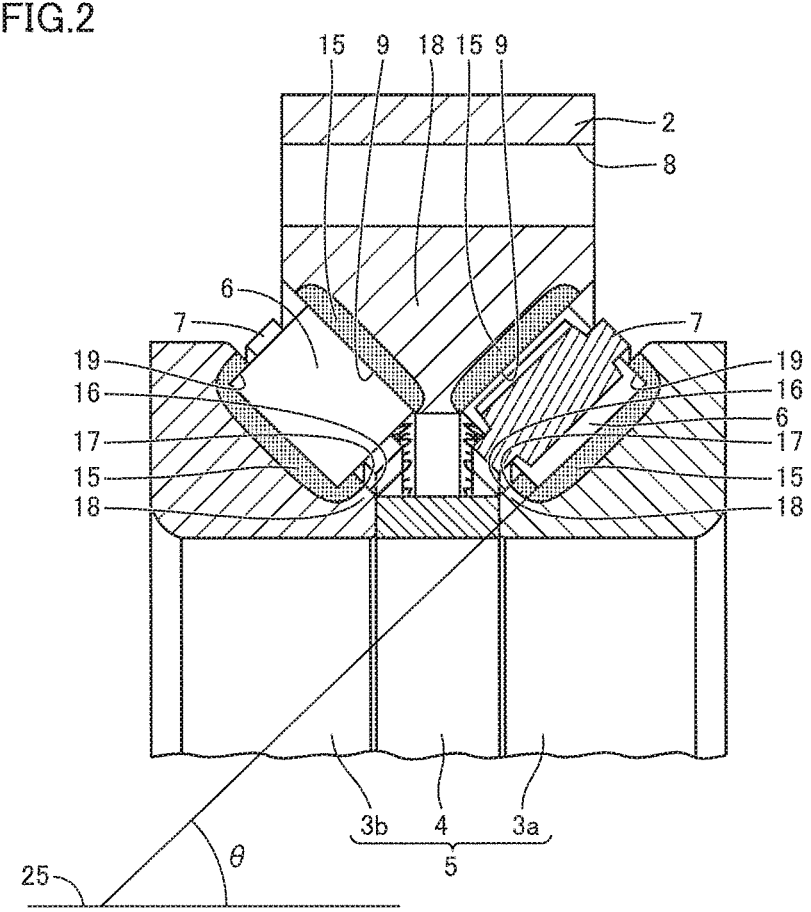
FIG. 2 is a partial cross-sectional schematic view taken along a line II-II shown in FIG. 1.

The double row tapered roller bearing shown in FIGS. 1 and 2 mainly comprises: an outer ring 2 serving as a bearing ring having an annular shape; an inner ring 5 disposed on an inner circumferential side of outer ring 2 and serving as a bearing ring having an annular shape; a plurality of rollers 6 serving as rolling elements; and a cage 7 defining how the plurality of rollers 6 are disposed. A bolt hole 8 is formed in outer ring 2. Bolt hole 8 is formed to extend in a thrust direction of the double row tapered roller bearing. Furthermore, outer ring 2 has an inner circumferential surface with two raceway surfaces formed thereon. The two raceway surfaces include a hardened region 15. Furthermore, a portion of outer ring 2 other than that having hardened region 15 is an unhardened region 18 lower in hardness than hardened region 15.

Inner ring 5 includes two inner ring members 3a and 3b and an inner ring spacer 4. Two inner ring members 3a and 3b each have an annular shape. Inner ring spacer 4 has an annular shape and is disposed between inner ring members 3a and 3b. Inner ring spacer 4 may be dispensed with. Inner ring members 3a and 3b each have an outer circumferential surface 16 facing outer ring 2 and having a groove having a bottom surface serving as a raceway surface. That is, inner ring 5 has two rows of grooves 19. From another point of view, outer circumferential surface 16 means a surface portion of inner ring member 3a, 3b that extends along the central axis of roller 6. Rollers 6 are disposed in groove 19 in contact with the raceway surface of inner ring 5 and are also in contact with outer ring 2. Roller 6 is a tapered roller. At outer circumferential surface 16 of inner ring 5, a region adjacent to groove 19 includes hardened region 15 extending from the inner peripheral surface of groove 19 to the region adjacent to groove 19, and unhardened region 18 located at a position farther from groove 19 than hardened region 15 and being smaller in hardness than hardened region 15. The region of outer circumferential surface 16 of inner ring 5 that is adjacent to groove 19 as shown in FIG. 2 is a region that sandwiches groove 19 in a direction along central axis 25 of inner ring 5 and extends along the central axis of roller 6. From another point of view, at outer circumferential surface 16 of inner ring 5, hardened region 15 is formed adjacent to annular groove 19 along groove 19. From another point of view, a boundary portion 17 between hardened region 15 and unhardened region 18 is annularly arranged along groove 19. Hardened region 15 is formed to extend from bottom and side surfaces of groove 19 to outer circumferential surface 16.

An angle θ that the bottom surface of groove 19 serving as the raceway surface forms with central axis 25 of inner ring 5 is at least 400 and not more than 500. Further, angle θ may be 450.

<Function and Effect of Double Row Tapered Roller Bearing>

In double row tapered roller bearing 1 shown in FIGS. 1 and 2, outer circumferential surface 16 of inner ring 5 includes unhardened region 18, and machining such as drilling unhardened region 18 can be easily performed. Further, outer ring 2 similarly has unhardened region 18, and bolt hole 8 can be easily formed after a heat treatment for forming hardened region 15 is performed.

In double row tapered roller bearing 1, angle θ that the bottom surface of groove 19 serving as the raceway surface forms with central axis 25 of inner ring 5 is at least 40° and not more than 50°, and double row tapered roller bearing 1 can alone provide a large action point distance. Accordingly, applying double row tapered roller bearing 1 as a bearing for a main shaft of a wind turbine generator allows a bearing portion for the main shaft of the wind power generator to be dimensionally smaller than applying a plurality of cylindrical roller bearings as a bearing for that main shaft does.

<Configuration of Wind Turbine Generator with Double Row Tapered Roller Bearing Applied Thereto>

Figure 3:
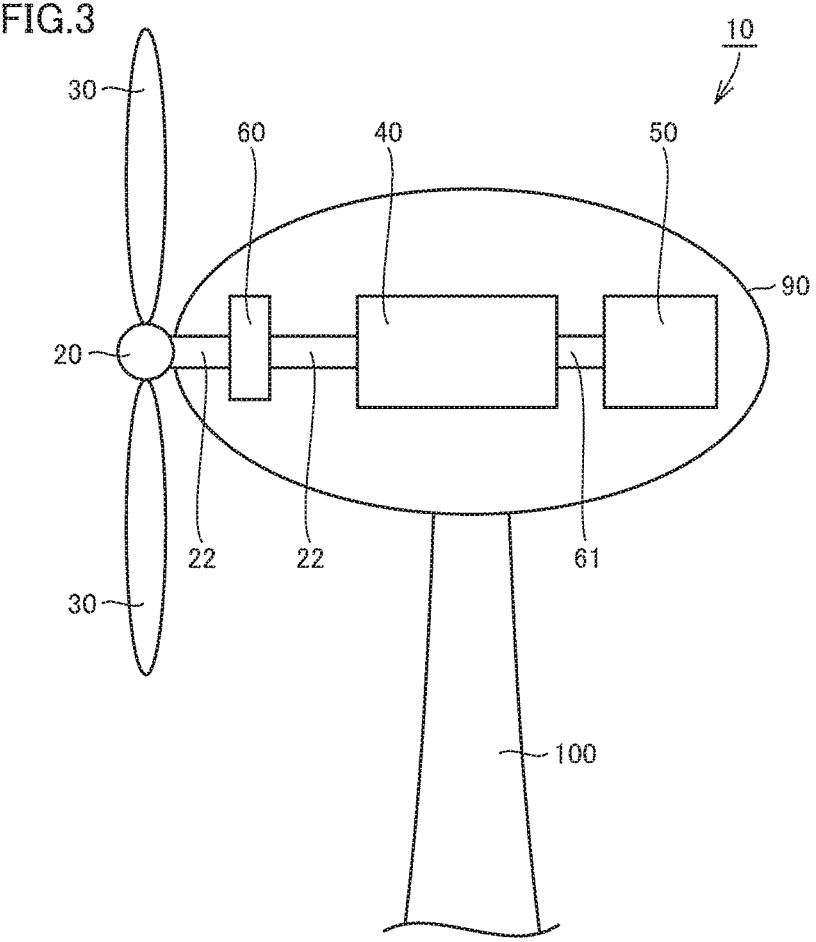
FIG. 3 is a schematic view for illustrating a wind turbine generator with the FIG. 1 double row tapered roller bearing applied thereto.

With reference to FIG. 3, a configuration of a wind turbine generator to which the double row tapered roller bearing shown in FIG. 1 is applied will be described.

With reference to FIG. 3, a wind turbine generator 10 mainly includes a main shaft 22, a blade 30, a speed up gear 40, a power generator 50, and a main shaft bearing 60. Speed up gear 40, power generator 50 and main shaft bearing 60 are housed in a nacelle 90. Nacelle 90 includes a housing and is supported by a tower 100. That is, nacelle 90 is provided at an upper end of tower 100 of the wind turbine generator.

A plurality of blades 30 are attached to a rotor head 20 connected to the upper end of main shaft 22. Main shaft 22 is supported inside nacelle 90. The rotation of main shaft 22 is transmitted to power generator 50 via speed up gear 40.

Main shaft 22 is fixed to penetrate the inner ring of main shaft bearing 60, and enters nacelle 90 from rotor head 20 and is connected to the input shaft of speed up gear 40. Main shaft 22 is rotatably supported by main shaft bearing 60. And main shaft 22 transmits rotation torque that is generated by blade 30 receiving wind power to the input shaft of speed up gear 40. Blade 30 converts wind power into rotation torque, and transmits it to main shaft 22.

Main shaft bearing 60 is disposed in nacelle 90 in a fixed manner and supports main shaft 22 rotatably. More specifically, the outer ring of main shaft bearing 60 is fixed to the housing of nacelle 90. Main shaft bearing 60 is constituted by double row tapered roller bearing 1 shown in FIGS. 1 and 2. Furthermore, double row tapered roller bearing 1 shown in FIGS. 1 and 2 used as main shaft bearing 60 is fixed to nacelle 90 by bolts inserted through bolt holes 8 of outer ring 2 shown in FIG. 2.

Speed up gear 40 is provided between main shaft 22 and power generator 50, accelerates the rotation speed of main shaft 22 and outputs it to power generator 50. As an example, speed up gear 40 is composed of a gear speed-up mechanism including a planetary gear, a countershaft, a high speed shaft, etc. Power generator 50 is connected to an output shaft 61 of speed up gear 40, and generates electric power by the rotation torque received from speed up gear 40. Power generator 50 is an induction generator, for example.

The wind turbine generator is configured to be capable of performing a yaw motion to rotate nacelle 90 in accordance with the wind direction with respect to tower 100 fixed on the ground. Preferably, nacelle 90 is rotated so that the blade 30 side is positioned windward.

Further, wind turbine generator 10 may be configured to obtain appropriate rotation by changing an angle (hereinafter referred to as a pitch) of blade 30 with respect to the wind direction depending on the strength of the wind force. Furthermore, wind turbine generator 10 may be configured to similarly control the blades' pitch when starting and stopping the wind turbine. Further, wind turbine generator 10 may also be configured so that each blade 30 swings by several degrees while main shaft 22 is rotated once. By doing so, an amount of energy that can be obtained from wind can be adjusted. For example, for strong wind, the blades have a wind receiving surface (also referred to as a wing surface) set parallel to the wind direction in order to suppress the rotation of the wind turbine.

<Method for Producing Bearing Ring of Double Row Tapered Roller Bearing, and Double Row Tapered Roller Bearing>

A method for producing a bearing ring of a double row tapered roller bearing and the double row tapered roller bearing will be described with reference to FIGS. 4 to 9. While a method for producing inner ring member 3a (see FIG. 2) will mainly be described as a method for producing a bearing ring, inner ring member 3b (see FIG. 2) and outer ring 2 can also be similarly produced.

Figure 4:
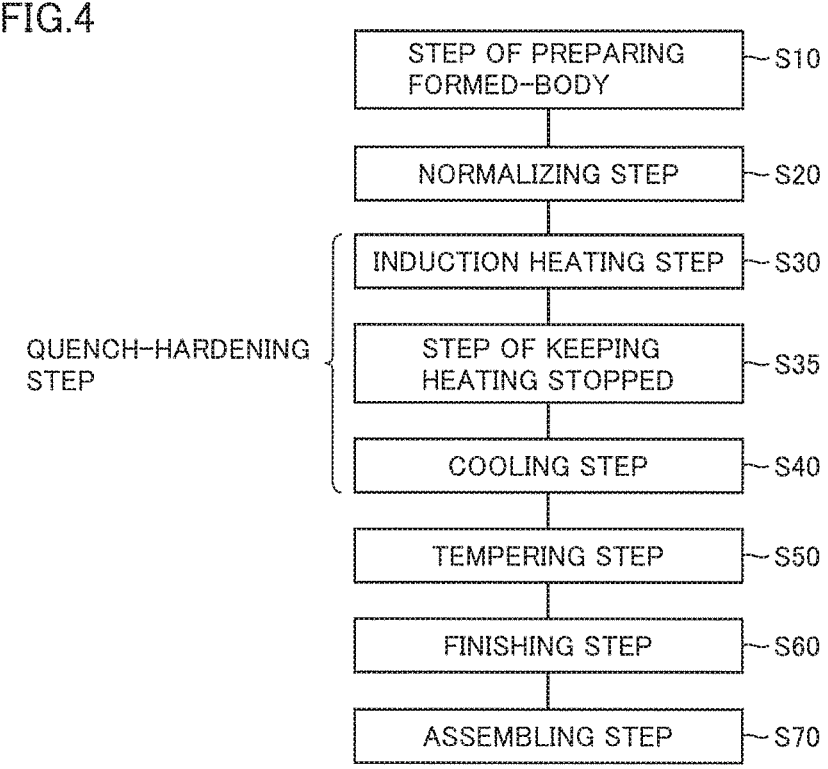
FIG. 4 is a flow chart generally representing a method for producing a bearing ring of the double row tapered roller bearing shown in FIG. 1 and the double row tapered roller bearing.

Referring to FIG. 4, a formed body preparation step is first carried out as a step (S10) in the method for producing an inner ring according to the present embodiment. In this step (S10), a steel stock having an any component composition suitable for induction quenching, e.g., a steel stock which contains at least 0.43 mass % and not more than 0.65 mass % of carbon, at least 0.15 mass % and not more than 0.35 mass % of silicon, at least 0.60 mass % and not more than 1.10 mass % of manganese, at least 0.30 mass % and not more than 1.20 mass % of chromium, and at least 0.15 mass % and not more than 0.75 mass % of molybdenum with the rest consisting of iron and an impurity is prepared, and the steel stock is forged, turned, etc. to prepare a formed body having a shape corresponding to a desired shape of the inner ring. More specifically, a formed body corresponding to the shape of an inner ring having an inner diameter of at least 1000 mm is prepared. When the inner ring to be produced is particularly large and the steel is required to have higher quenchability, a steel stock to which at least 0.35 mass % and not more than 0.75 mass % of nickel is added in addition to the aforementioned alloy components may be employed. As steels satisfying the aforementioned component composition, JIS S53C, JIS SUP13, JIS SCM445, SAE 8660H etc. can be listed, for example.

Figure 5:
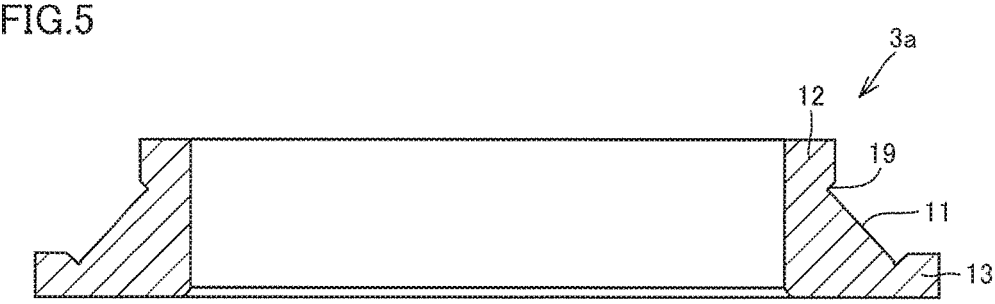
FIG. 5 is a schematic cross-sectional view of a formed body.
Figure 6:
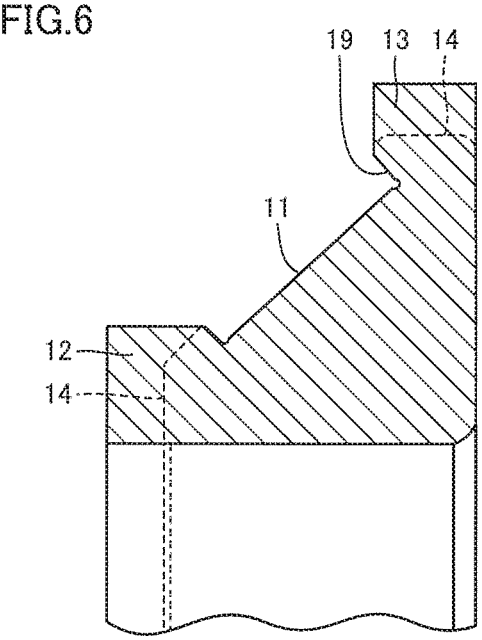
FIG. 6 is a partial, schematic cross-sectional view of the formed body.

As shown in FIG. 5 and FIG. 6, the formed body is constituted of steel and has an outer circumferential surface having annular groove 19 having a bottom surface to serve as a raceway surface 11 of the bearing ring. Further, the formed body includes excessive portions 12, 13 in which a region adjacent to groove 19 extends outwardly of a position indicated by a dotted line 14 representing an outer circumferential surface of the bearing ring (or inner ring member 3b). Excessive portion 12 can be set in thickness to, for example, 1 mm or more and 5 mm or less in a direction along the central axis of the formed body. Excessive portion 13 can be set in thickness to, for example, 1 mm or more and 5 mm or less in a radial direction perpendicular to the central axis of the formed body.

Then, a normalizing step is carried out as a step (S20). In this step (S20), the formed body prepared in the step (S10) is heated to a temperature of at least an $A_1$ transformation point and thereafter cooled to a temperature of less than the $A_1$ transformation point, whereby normalizing is performed. At this time, a cooling rate in the cooling in the normalizing may simply be a cooling rate at which the steel constituting the formed body does not transform into martensite, i.e., a cooling rate of less than a critical cooling rate. Hardness of the formed body after the normalizing becomes high when this cooling rate increases, and becomes low when the cooling rate decreases. Therefore, desired hardness can be imparted to the formed body by adjusting the cooling rate.

Figure 7:
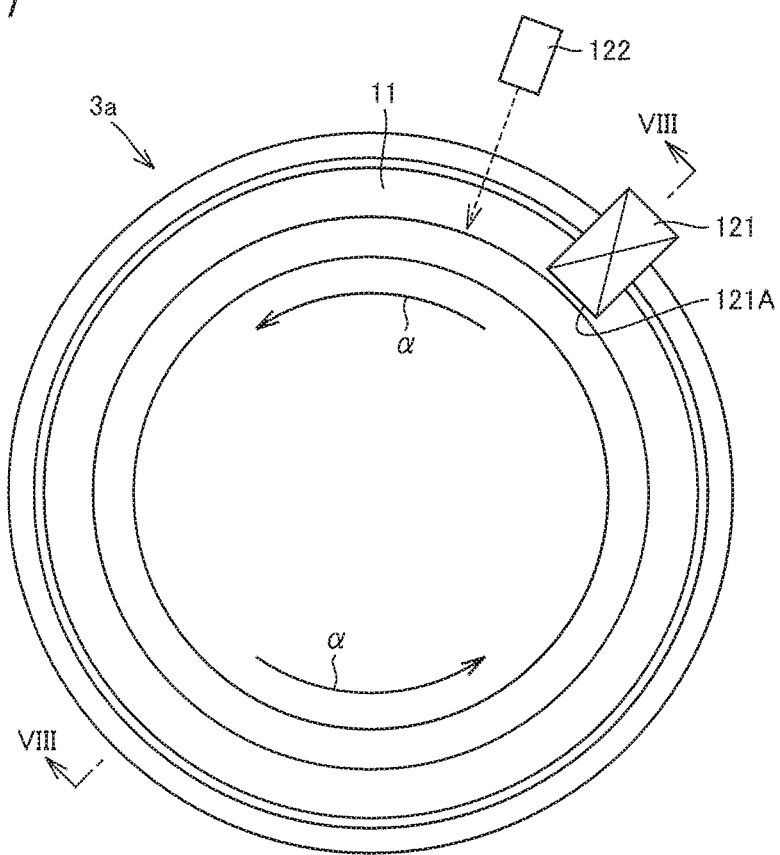
FIG. 7 is a schematic diagram for illustrating a quench hardening step.
Figure 8:
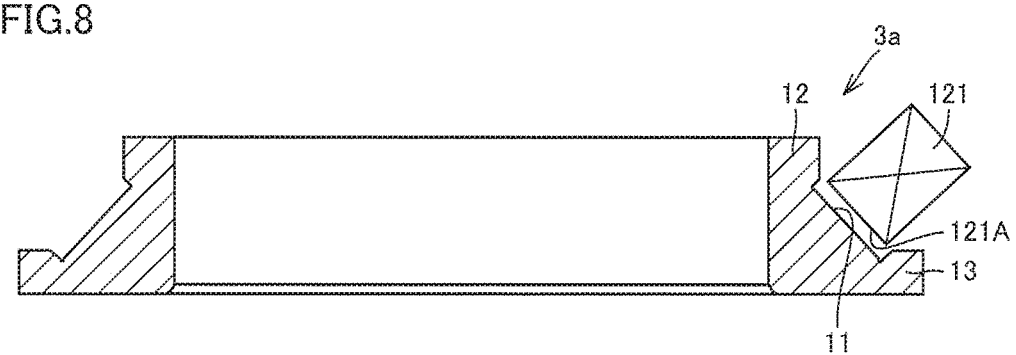
FIG. 8 is a schematic sectional view taken along a line VIII-VIII shown in FIG. 7.

Then, referring to FIG. 4, a quench hardening step is carried out. This quench hardening step includes an induction heating step carried out as a step (S30), a step of keeping heating stopped carried out as a step (S35), and a cooling step carried out as a step (S40). In step (S30), referring to FIGS. 7 and 8, a coil 121 as an induction heating coil is arranged to face the formed body at part of a raceway surface 11 (an annular region) which is a surface where a rolling element should roll. Note that an induction heating region 121A of coil 121 facing raceway surface 11 and contributing to heating raceway surface 11 is included in a single plane as shown in FIGS. 7 and 8. That is, a region of coil 121 facing raceway surface 11 has a planar shape included in a single plane.

Then, the formed body is rotated about the central axis, more specifically, in a direction of arrow α, while a high-frequency current is supplied to coil 121 from a power source (not shown). Thus, a surface layer region of the formed body including raceway surface 11 is induction-heated to a temperature of at least the $A_1$ point, and an annular heated region along raceway surface 11 is formed. At the time, the temperature of the surface of raceway surface 11 is measured with a thermometer 122 such as a radiation thermometer, and controlled. Further, specific conditions for the induction quenching can be properly set in consideration of conditions such as the size and thickness of and the materials for the bearing ring (the formed body), the capacity of the power source and the like. More specifically, referring to FIG. 3, for example, when induction-quenching raceway surface 11 of a formed body having an outer diameter $d_1$ of 2000 mm, an inner diameter $d_2$ of 1860 mm and a width t of 100 mm, the formed body's rotational speed can be 30 rpm, the power source's frequency can be 3 kHz, and a total amount of heat generated by induction heating can be 250 kW.

Subsequently, as step (S35), the formed body with the heated region formed in step (S30) is held in a state where heating is stopped. Step (S35) is performed in order to suppress dispersion in temperature in the circumferential direction, and the step is performed after completion of the induction heating before the cooling to a temperature of not more than the $M_s$ point. More specifically, for the shape of the formed body and the heating condition, as described above, dispersion in temperature of the surface of the heated region in the circumferential direction can be suppressed to about not more than 20° C. by retaining the formed body in the state where the heating is stopped for three seconds after completion of the heating, for example.

Then, in the step (S40), water as a cooling liquid, for example, is injected toward the whole of the formed body including the heated region formed in the step (S30), whereby the whole of the heated region is simultaneously cooled to a temperature of not more than the $M_s$ point. Thus, the heated region transforms into martensite, and a region including raceway surface 11 hardens. Through the aforementioned procedure, induction quenching is performed, and the quench hardening step is completed.

Then, a tempering step is carried out as a step (S50). In this step (S50), the formed body quench-hardened in the steps (S30) and (S40) is charged into a furnace, for example, heated to a temperature of not more than the $A_1$ point and retained for a prescribed time, whereby tempering is performed.

Figure 9:
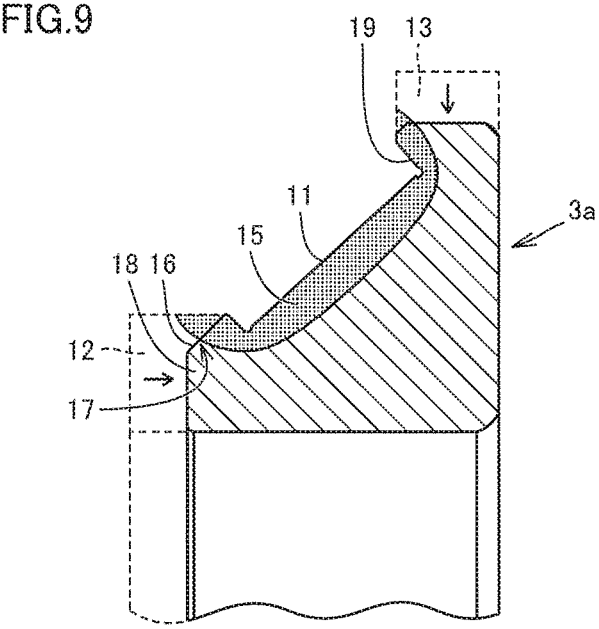
FIG. 9 is a schematic diagram for illustrating a finishing step.

Then, a finishing step is carried out as a step (S60). In this step (S60), as shown in FIG. 9, by removing excessive portions 12, 13 of the formed body, inner ring member 3a has its shape adjusted, and other required working such as polishing raceway surface 11 or similar finishing is carried out. Through the aforementioned process, inner ring member 3a constituting an inner ring of a double row tapered roller bearing is completed. Inner ring member 3a has an inner diameter of at least 1000 mm and has a quench-hardened layer homogeneously formed by induction quenching along raceway surface 11 circumferentially.

Further, inner ring member 3a has excessive portions 12, 13 removed after a heat treatment to expose hardened region 15 and unhardened region 18 at a region of outer circumferential surface 16 adjacent to groove 19 (in FIG. 9, a region of outer circumferential surface 16 located closer to the central axis of inner ring member 3a, as seen at groove 19). By detecting that inner ring member 3a has outer circumferential surface 16 with hardened region 15 and unhardened region 18 formed therein, whether inner ring member 3a has been produced by using the method for producing a bearing ring according to the present disclosure as described above can be easily detected. Whether hardened region 15 and unhardened region 18 are formed in outer circumferential surface 16 at a region adjacent to groove 19 can be detected in a conventionally well known method such as hardness measurement. Note that a width of hardened region 15 in outer circumferential surface 16, that is, a distance from an end of the opening of groove 19 to an end of hardened region 15, can be set to 2 mm or more and 10 mm or less. Furthermore, in FIG. 9, only a region of outer circumferential surface 16 located closer to the central axis of inner ring member 3a as seen at groove 19 has both hardened region 15 and unhardened region 18, and a region of outer circumferential surface 16 located radially outer as seen at groove 19 exposes only hardened region 15. However, in the present disclosure, a region of outer circumferential surface 16 exposing both hardened region 15 and unhardened region 18 may be only the region of inner ring member 3a located radially outer as seen at groove 19 or may be both the region radially outer as seen at groove 19 and the region located closer to the central axis as described above.

Figure 13:
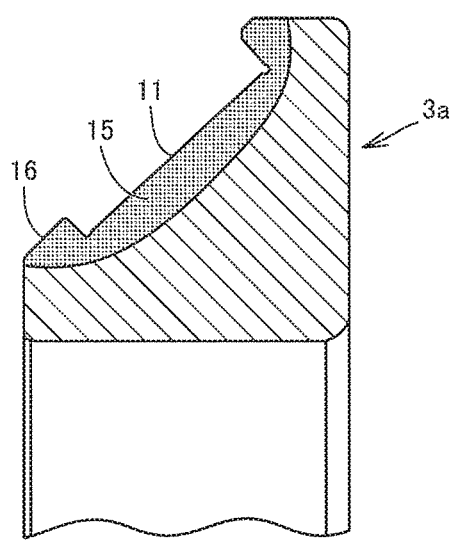
FIG. 13 is a partial cross-sectional schematic view of a bearing ring as a comparative example.

Note that when excessive portions 12, 13 (see FIG. 9) are not formed, and the heat treatment is performed as described above in that condition, then, as shown in FIG. 13, hardened region 15 is formed in the inner ring member 3a at a surface facing outer ring 2 (see FIG. 2), i.e., the entirety of outer circumferential surface 16. This is because excessive portions 12, 13 do not exist and accordingly, inner ring member 3a has outer circumferential surface 16 entirely heated by induction heating.

Furthermore, an assembling step is carried out as a step (S70). In this step (S70), inner ring member 3a produced as described above and inner ring member 3b and outer ring 2 produced in the same manner as inner ring member 3a are assembled together with rollers 6 (FIG. 2) as separately prepared rolling elements, cage 7 (see FIG. 2), inner ring spacer 4 (see FIG. 2), and the like, whereby double row tapered roller bearing 1 as shown in FIGS. 1 and 2 is assembled. By the above procedure, the method for producing the double row tapered roller bearing according to the present embodiment is completed. Furthermore, from another point of view, a method for producing double row tapered roller bearing 1 shown in FIGS. 1 and 2 comprises the steps of: preparing a bearing ring (outer ring 2, inner ring members 3a and 3b, inner ring spacer 4 shown in FIG. 2); preparing tapered rollers 6; and assembling double row tapered roller bearing 1 by combining the bearing ring and the rollers. The bearing ring (inner ring members 3a and 3b) is produced in the method for producing a bearing ring as described above.

According to the present embodiment, coil 121 arranged to face part of raceway surface 11 of the formed body is relatively rotated along the circumferential direction of the formed body in the step (S30), whereby the heated region is formed on the formed body. Therefore, it is possible to employ coil 121 small with respect to the outer shape of the formed body, and the production cost for a quenching apparatus can be suppressed even in a case of quench-hardening a large-sized formed body. In the present embodiment, further, the whole of the heated region is simultaneously cooled to a temperature of not more than the $M_s$ point. Therefore, it becomes possible to form hardened region 15 which is an annular quench-hardened region homogeneous in the circumferential direction, and residual stress is prevented from concentrating on a partial region. Furthermore, in the present embodiment, a steel having a proper component composition which is capable of implementing sufficiently high hardness by quench hardening and is also capable of suppressing quench cracking while ensuring high quenchability is employed as a material. Consequently, the method for producing an inner ring according to the present embodiment is a method for producing a bearing ring capable of homogeneously forming a quench-hardened layer by induction quenching along a raceway surface circumferentially while suppressing the production cost for a quenching apparatus.

While the aforementioned step (S20) is not an essential step in the method for producing a bearing ring according to the present invention, by carrying out this, the hardness of the unhardened region (a region other than the quench-hardened layer) of the bearing ring produced can be adjusted. It is also possible to achieve the adjustment of the hardness of the unhardened region by quenching and tempering in place of the step (S20). However, a steel having a relatively high carbon content and having the aforementioned component composition exhibiting high quenchability is employed as a material in the present embodiment, and hence quench cracking easily takes place. Accordingly, normalizing is preferably performed as the step (S20) for adjustment of the unhardened region in hardness.

Furthermore, in the present embodiment, in step (S30), coil 121 having a shape allowing the coil to have an induction-heating region included in a single plane is used. Therefore, even when quenching formed body 10 (or an inner ring) different in size, shape, etc., a coil corresponding to the shape of the formed body (or the inner ring) is not required, which can contribute to a reduced production cost of the quenching apparatus. Furthermore, in the present embodiment, in step (S35) the formed body is retained in a state where heating is stopped. This can suppress dispersion in temperature of the formed body in the circumferential direction.

Thus, according to the method for producing an inner ring according to the present embodiment, a quench-hardened layer can be homogeneously formed by induction quenching along the raceway surface circumferentially while suppressing the production cost for the quenching apparatus.

Furthermore, according to the method for producing a rolling bearing according to the present embodiment, a rolling bearing comprising a bearing ring having a quench-hardened layer formed by induction quenching along a raceway surface circumferentially can be produced at a reduced cost.

It should be noted that although the normalizing step performed in step (S20) is not an essential step in the method for producing a bearing ring according to the present invention, carrying out this step allows a formed body of steel such as JIS SS53C, JIS SUP13, JIS SCM445, SAE 8660H, etc. to be adjusted in hardness while suppressing quench cracking.

In this step (S20), hard particles may be sprayed to the formed body along with a gas to perform shot blasting while cooling the formed body. Thus, the shot blasting can be performed simultaneously with air-blast cooling at the time of the normalizing, and scales formed on a surface layer portion of the formed body are removed, and reduction of characteristics of inner ring member 3a resulting from formation of the scales, reduction of thermal conductivity resulting from formation of the scales, etc. are suppressed. As the hard particles (a projection material), metal particles made of steel, cast iron etc. can be employed, for example.

While the formed body may rotate at least once in the aforementioned step (S30), the same preferably rotates a plurality of times in order to implement more homogeneous quench hardening by suppressing dispersion in temperature in the circumferential direction. In other words, coil 121 as an induction heating coil preferably relatively rotates at least twice along the circumferential direction of raceway surface 11 of the formed body. Thus, homogeneous quench hardening can be implemented by suppressing dispersion in temperature of the raceway surface in the circumferential direction.

<Function and Effect of the Above Production Method>

The method for producing a bearing ring according to the present disclosure as shown in FIGS. 4 to 9 is a method for producing a bearing ring of a double row tapered roller bearing and comprises the steps of: preparing a formed body (S10); forming a heated region (S30); retaining the formed body in a state in which heating is stopped (S35); cooing (S40); and removing (S60), as described above. In the step of preparing a formed body (S10), there is prepared a formed body constituted of steel and having an outer circumferential surface having annular groove 19 having a bottom surface to serve as raceway surface 11 of the bearing ring. In the step of forming a heated region (S30), the formed body is induction heated to form a heated region including the bottom surface of groove 19 and heated to a temperature of at least the $A_1$ point. The step of retaining the formed body in a state in which heating is stopped (S35) is performed after the step of forming a heated region (S30) before the cooling step (S40). In the cooling step (S40), the whole of the heated region is simultaneously cooled to a temperature of not more than the $M_s$ point. In the step of preparing a formed body (S10), the formed body includes excessive portions 12, 13 in which a region adjacent to groove 19 extends outwardly of a position which should be an outer circumferential surface of the bearing ring. In the removing step (S60), the excessive portions 12 and 13 are removed from the formed body after the cooling step (S40).

This allows induction heating to be performed to selectively quench a heated region including a bottom surface of groove 19 to serve as raceway surface 11 of inner ring member 3a constituting a bearing ring, and accordingly, allows the bearing ring to be produced through a process simpler than when performing a carburizing heat treatment accompanied by an anti-carburization treatment and can also reduce a period of time required for the process. This allows the bearing ring to be produced at a reduced cost.

Furthermore, the quenching process performed in a state where excessive portions 12 and 13 are present adjacent to groove 19 to be heated can reduce a possibility of overheating or overcooling and thus quench-cracking an end of the opening of groove 19, that is, a (corner) portion connecting an inner peripheral surface of groove 19 and the outer circumferential surface of inner ring member 3a serving as a bearing ring, as would be in a case without excessive portions 12 and 13. That is, excessive portions 12 and 13 allow uniform heated and cooled states around groove 19 in the step of forming a heated region (S30) and the cooling step (S40). From a different point of view, excessive portions 12 and 13 can suppress uneven quenching resulting from a mass effect around groove 19.

In the method for producing the bearing ring, as described above, the formed body may have an annular shape, as shown in FIG. 7 etc. In step of preparing a formed body (S10), excessive portions 12, 13 of the formed body may be annularly arranged so as to sandwich groove 19 in the direction of the central axis of the formed body. In that case, excessive portions 12 and 13 are arranged adjacent to the entire circumference of groove 19, which can suppress uneven quenching throughout groove 19.

In the method for producing the bearing ring, as described above, angle θ (see FIG. 2) that the bottom surface of groove 19 of the formed body forms with the central axis in the step of preparing a formed body (S10) may be 40° or more and 50° or less. In that case, in a bearing ring (inner ring member 3a) of a so-called steep double-row tapered roller bearing having angle θ falling within such a numerical range as indicated above, a difference easily arises in heated and cooled states in the quenching process at the outer circumferential surface of the bearing ring between a portion adjacent to groove 19 and a portion contiguous to the bottom surface of groove 19. Accordingly, the method for producing the bearing ring according to the present disclosure is particularly effective.

In the method for producing the bearing ring, as described above, at the step of preparing a formed body (S10), a formed body may be prepared which is constituted of steel containing at least 0.43 mass % and not more than 0.65 mass % of carbon, at least 0.15 mass % and not more than 0.35 mass % of silicon, at least 0.60 mass % and not more than 1.10 mass % of manganese, at least 0.30 mass % and not more than 1.20 mass % of chromium, and at least 0.15 mass % and not more than 0.75 mass % of molybdenum with the rest consisting of iron and an impurity.

Furthermore, in the method for producing the bearing ring, as described above, at the step of preparing a formed body (S10), a formed body may be prepared which is constituted of steel containing at least 0.43 mass % and not more than 0.65 mass % of carbon, at least 0.15 mass % and not more than 0.35 mass % of silicon, at least 0.60 mass % and not more than 1.10 mass % of manganese, at least 0.30 mass % and not more than 1.20 mass % of chromium, at least 0.15 mass % and not more than 0.75 mass % of molybdenum, and at least 0.35 mass % and not more than 0.75 mass % of nickel with the rest consisting of iron and an impurity.

Steel having such a component composition as a material is capable of implementing sufficiently high hardness by quench hardening and is capable of suppressing quench cracking while ensuring high quenchability.

The reason why the component range of the steel constituting the formed body, i.e., the component range of the steel constituting the bearing ring to be produced is set to the aforementioned range is now described.

Carbon: At Least 0.43 Mass % and not More than 0.65 Mass %

The carbon content exerts a remarkable influence on the hardness the raceway surface of the bearing ring after the quench hardening. If the carbon content in the steel constituting the bearing ring is less than 0.43 mass %, it may be difficult to impart sufficient hardness to the raceway surface after the quench hardening. If the carbon content exceeds 0.65 mass %, on the other hand, occurrence of cracking (quench cracking) at the time of the quench hardening is apprehended. Therefore, the carbon content is preferably set to at least 0.43 mass % and not more than 0.65 mass %.

Silicon: At Least 0.15 Mass % and not More than 0.35 Mass %

Silicon contributes to improvement in temper softening resistance of the steel. If the silicon content in the steel constituting the bearing ring is less than 0.15 mass %, the temper softening resistance becomes insufficient, and there is a possibility that the hardness of the raceway surface remarkably lowers due to tempering after the quench hardening or temperature rise during use of the bearing ring. If the silicon content exceeds 0.35 mass %, on the other hand, the hardness of the material before the quenching increases, and workability in cold working when forming the material into the bearing ring may be lowered. Therefore, the silicon content is preferably set to at least 0.15 mass % and not more than 0.35 mass %.

Manganese: At Least 0.60 Mass % and not More than 1.10 Mass %

Manganese contributes to improvement in quenchability of the steel. If the manganese content is less than 0.60 mass %, this effect is not sufficiently attained. If the manganese content exceeds 1.10 mass %, on the other hand, the hardness of the material before the quenching increases, and the workability in cold working lowers. Therefore, the manganese content is preferably set to at least 0.60 mass % and not more than 1.10 mass %.

Chromium: At Least 0.30 Mass % and not More than 1.20 Mass %

Chromium contributes to improvement in quenchability of the steel. If the chromium content is less than 0.30 mass %, this effect is not sufficiently attained. If the chromium content exceeds 1.20 mass %, on the other hand, there arises such a problem that the material cost rises. Therefore, the chromium content is preferably set to at least 0.30 mass % and not more than 1.20 mass %.

Molybdenum: At Least 0.15 Mass % and not More than 0.75 Mass %

Molybdenum also contributes to improvement in quenchability of the steel. If the molybdenum content is less than 0.15 mass %, this effect is not sufficiently attained. If the molybdenum content exceeds 0.75 mass %, on the other hand, there arises such a problem that the material cost rises. Therefore, the molybdenum content is preferably set to at least 0.15 mass % and not more than 0.75 mass %.

Nickel: At Least 0.35 Mass % and not More than 0.75 Mass %

Nickel also contributes to improvement in quenchability of the steel. While nickel is not an essential component in the steel constituting the bearing ring according to the present invention, the same can be added in a case where particularly high quenchability is required for the steel constituting the bearing ring, such as a case where the outer shape of the bearing ring is large. If the nickel content is less than 0.35 mass %, an effect of enhancing quenchability cannot be sufficiently attained. On the other hand, a nickel content exceeding 0.75 mass % increases an amount of retained austenite after quenching, which may cause reduction in hardness, reduction in dimensional stability, and the like. Therefore, nickel is preferably added in a range of at least 0.35 mass % and not more than 0.75 mass % to steel constituting the bearing ring.

The aforementioned method for producing a bearing ring further includes a step of normalizing the formed body in advance of the step of forming a heated region.

A bearing ring produced by partially quench-hardening a region including the raceway surface by induction quenching must have hardness also capable of ensuring prescribed strength in a region which is not quench-hardened (i.e., an unhardened region). In order to ensure prescribed hardness in the unhardened region, tempering may further be performed after entirely quenching the formed body (the bearing ring) before the induction quenching. When a steel having a component composition having a relatively high carbon content and allowing high quenchability is employed as a material, however, there is such a problem that quench cracking easily takes place. In the formed body consisting of steel having such a composition, on the other hand, sufficient hardness can be ensured by normalizing. Therefore, proper hardness can be supplied to the unhardened region by normalizing in advance of the induction quenching, in place of ensuring hardness by the aforementioned quenching and tempering.

In the aforementioned method for producing a bearing ring, at the step of normalizing, hard particles may be sprayed to the formed body along with a gas to perform shot blasting while cooling the formed body.

Thus, the shot blasting can be performed simultaneously with air-blast cooling at the time of the normalizing. Therefore, scales formed on a surface layer portion of the formed body due to heating in the normalizing are removed, and reduction of characteristics of the bearing ring resulting from formation of the scales, reduction of thermal conductivity resulting from formation of the scales, etc. are suppressed.

A method for producing a double row tapered roller bearing as shown in FIGS. 1 and 2 includes the steps of: preparing a bearing ring; preparing tapered rollers; and assembling a double row tapered roller bearing by combining the bearing ring and the rollers. Inner ring members 3a and 3b configuring the bearing ring are produced in the method for producing a bearing ring as described above. Thus double row tapered roller bearing 1 can be obtained that comprises inner ring members 3a and 3b having sufficient characteristics without causing a defect such as quench cracking or inviting an increased production cost.

Second Embodiment

A second embodiment which is another embodiment of the present invention is now described. A method for producing an inner ring and a rolling bearing according to the second embodiment is basically carried out similarly to the case of the first embodiment, and attains similar effects. However, the method for producing an inner ring and a roller bearing according to the second embodiment is different from the case of the first embodiment in arrangement of coil 121 in step (S30).

Figure 10:
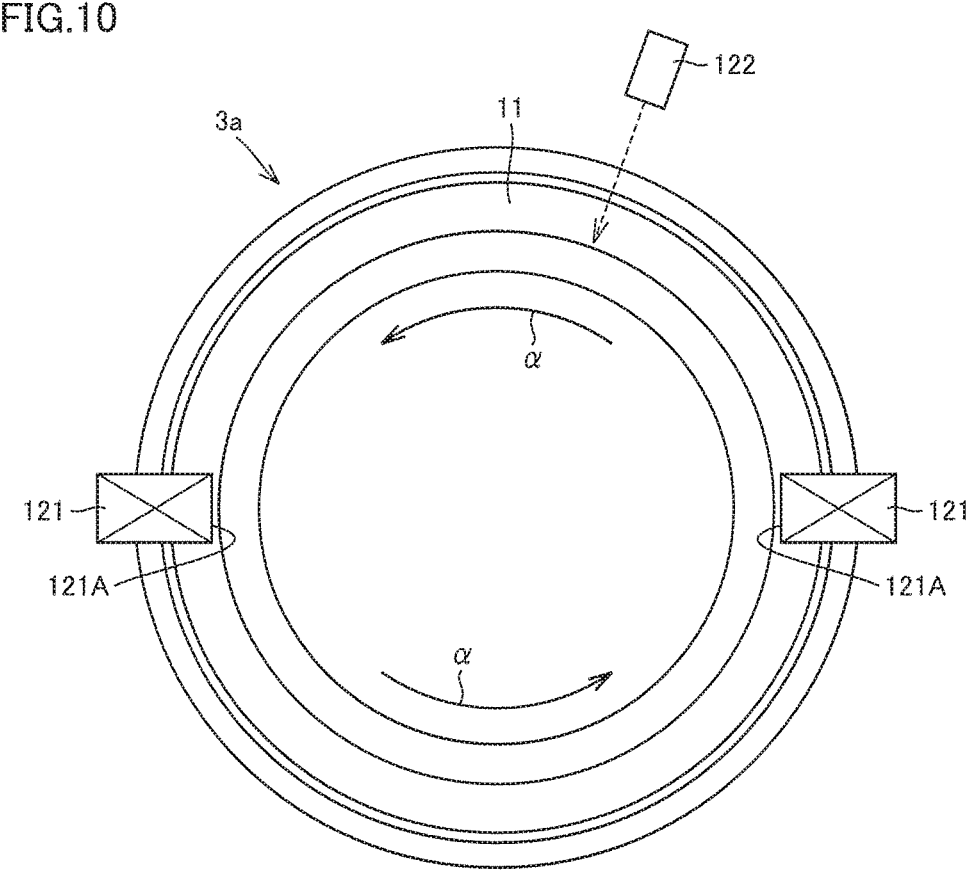
FIG. 10 is a schematic view for illustrating a first example of a quench-hardening step in a second embodiment.

In other words, referring to FIG. 10, a pair of coils 121 are arranged to sandwich the formed body therebetween in the step (S30) in the second embodiment. Then, the formed body is rotated in the direction of arrow α, while a high-frequency current is supplied to coils 121 from a power source (not shown). Thus, a surface layer region of the formed body including raceway surface 11 is induction-heated to a temperature of at least the $A_1$ point, and an annular heated region 11A along raceway surface 11 is formed.

Figure 11:
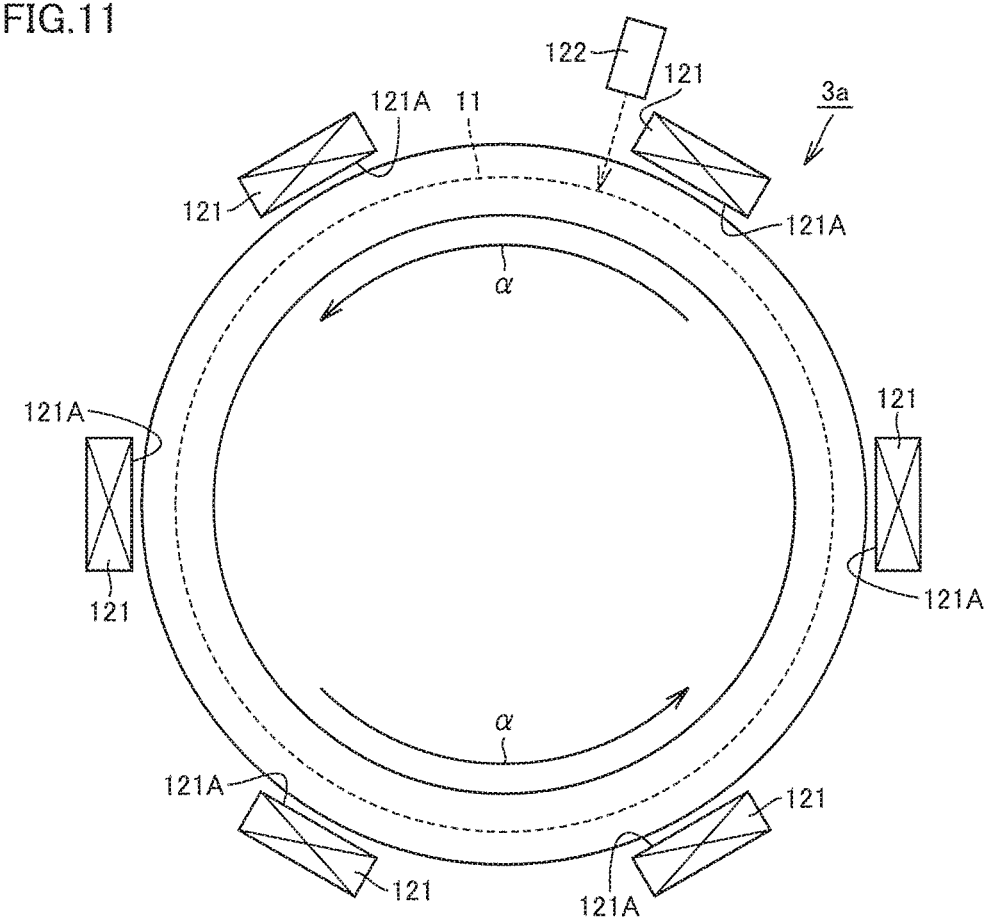
FIG. 11 is a schematic view for illustrating a second example of the quench-hardening step in the second embodiment.

Furthermore, with reference to FIG. 11, a plurality of (i.e., three or more: in the present embodiment, six) coils 121 are arranged along raceway surface 11 formed on the outer circumferential surface of the formed body in the second embodiment at the step (S30). Then, similarly as done in the first embodiment, the formed body is rotated in the direction of arrow α, while a high-frequency current is supplied to coils 121 from a power source (not shown). Thus, a surface layer region of the formed body including raceway surface 11 is induction-heated to a temperature of at least the $A_1$ point, and annular heated region 11A along raceway surface 11 is formed.

Thus, a plurality of coils 121 are arranged along the circumferential direction of the formed body, whereby the method for producing an inner ring of a rolling bearing according to the second embodiment has become a method for producing a bearing ring capable of implementing homogeneous quench hardening by suppressing dispersion in temperature in the circumferential direction. In order to further suppress the dispersion in temperature in the circumferential direction, coils 121 are preferably equally spaced in the circumferential direction of the formed body.

Third Embodiment

A third embodiment which is a further embodiment of the present invention is now described. A method for producing an inner ring according to the third embodiment is basically carried out similarly to the cases of the first and second embodiments, and attains similar effects. However, the method for producing an inner ring according to the third embodiment is different from the cases of the first and second embodiments in arrangement of thermometer 122 in step (S30).

Figure 12:
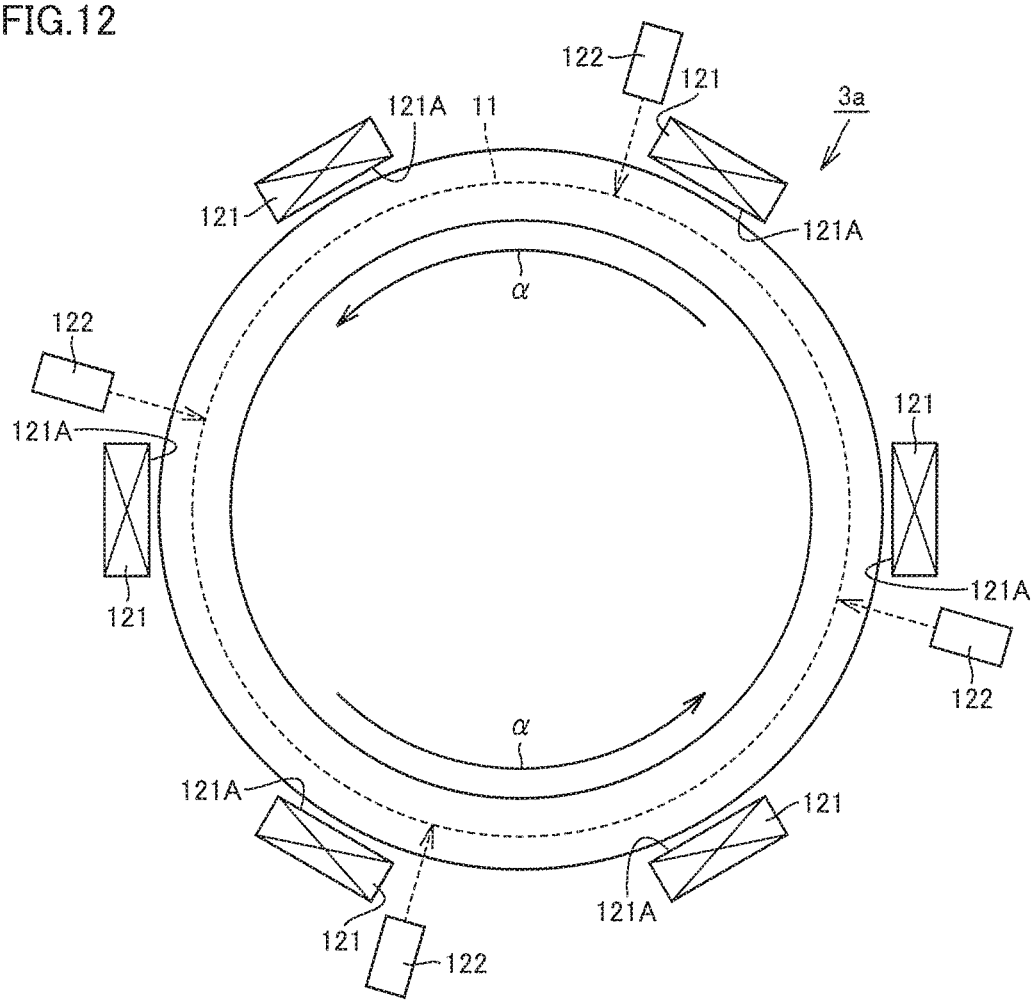
FIG. 12 is a schematic view for illustrating a quench-hardening step in a third embodiment.

In other words, referring to FIG. 12, in the third embodiment, in step (S30) a heated region, or raceway surface 11, has its temperature measured at a plurality of portions thereof (four portions in this embodiment). More specifically, a plurality of thermometers 122 are arranged such that they are equally spaced along the circumferential direction of raceway surface 11 of the formed body in the step (S30) in the third embodiment.

As raceway surface 11 has its temperature measured in the circumferential direction at a plurality of portions thereof simultaneously, quench hardening can be performed by rapidly cooling the formed body after confirming that homogeneous heating is implemented in the circumferential direction of raceway surface 11. Consequently, further homogeneous quench hardening can be implemented in the circumferential direction of raceway surface 11 according to the method for producing an inner ring of a rolling bearing according to the third embodiment.

While the case of fixing coils 121 and rotating the formed body has been described in the aforementioned embodiment, coils 121 may be rotated in the circumferential direction of the formed body while fixing the formed body, or coils 121 may be relatively rotated along the circumferential direction of the formed body by rotating both coils 121 and the formed body. However, wires or the like supplying a current to coils 121 are necessary for coils 121, and hence it is often rational to fix coils 121 as described above.

While the length of coils 121 as induction heating members in the circumferential direction of the formed body can be so properly decided as to efficiently implement homogeneous heating, the same can be set to about 1/12 of the length of the region to be heated, i.e., a length of such a degree that a central angle with respect to the central axis of the formed body (or the bearing ring) becomes 30°, for example.

While in the aforementioned embodiment a case has been described in which an inner ring of a radial rolling bearing as one example of a ring-shaped member is heat-treated and produced, a ring-shaped member to which the present invention is applicable is not limited thereto, and it may be an outer ring of a radial rolling bearing or a bearing ring of a thrust bearing, for example. Further, the present invention is applicable to heat-treating and producing not only a ring-shaped member that is a bearing ring of a bearing but also various ring-shaped members made of steel. In a case of heating an outer ring of a radial rolling bearing, for example, in the step (S30), coils 121 may be arranged to face a raceway surface formed on an inner circumferential side of a formed body. In a case of heating a bearing ring of a thrust rolling bearing, for example, in the step (S30), coils 121 may be arranged to face a raceway surface formed on an end surface side of a formed body.

Further, while in the above embodiments a case has been described in which a feature of induction quenching capable of partially quench-hardening a workpiece to be processed is exploited to quench-harden only a surface layer portion including a raceway surface of a bearing ring of a rolling bearing, i.e., to perform partial quenching, the present invention is applicable not only to partial quenching but is also applicable to quench hardening a bearing ring entirely for example.

While an embodiment of the present invention has been described as above, the embodiment can be variously modified. Further, the present invention is not limited in scope to the above-described embodiment. The scope of the present invention is defined by the terms of the claims, and is intended to include any modifications within the meaning and scope equivalent to the terms of the claims.

INDUSTRIAL APPLICABILITY

The present embodiment is advantageously applicable to a double row tapered roller bearing applied to a wind turbine generator, in particular.

REFERENCE SIGNS LIST

1: bearing; 20: outer ring; 3a, 3b: inner ring member; 4: inner ring spacer; 5: inner ring; 6: roller; 7: cage; 8: bolt hole; 9: raceway surface; 10: wind turbine generator; 11: raceway surface; 12, 13: excessive portion; 14: dotted line; 15: hardened region; 16: outer circumferential surface 17: boundary portion; 18: unhardened region; 19: groove; 20: rotor head; 22: main shaft; 25: central axis; 30: blade; 40: speed up gear; 50: power generator; 60 main shaft bearing; 61: output shaft; 90: nacelle; 100: tower; 121: coil; 121A: induction-heated region; 122: thermometer.

The invention claimed is:
1. A double row tapered roller bearing comprising:
an outer ring serving as a bearing ring having an annular shape;
an inner ring disposed on an inner circumferential side of the outer ring and serving as a bearing ring having an annular shape, the inner ring including two inner ring members, each having an outer circumferential surface facing the outer ring and each having a row of grooves having a bottom surface serving as a raceway surface; and tapered rollers disposed in the grooves in each of the two inner ring members in contact with the raceway surface of that inner ring member and being also in contact with the outer ring, at the outer circumferential surface of each of the inner ring members of the inner ring, a region adjacent to the groove including a hardened region extending from an inner peripheral surface of the groove to the region adjacent to the groove, and an unhardened region located at a position farther from the groove than the hardened region and being smaller in hardness than the hardened region, the inner ring being constituted of steel containing at least 0.43 mass % and not more than 0.65 mass % of carbon, at least 0.15 mass % and not more than 0.35 mass % of silicon, at least 0.60 mass % and not more than 1.10 mass % of manganese, at least 0.30 mass % and not more than 1.20 mass % of chromium, and at least 0.15 mass % and not more than 0.75 mass % of molybdenum with the rest consisting of iron and an impurity, wherein an angle that the raceway surface of the grooves of each of the inner ring members forms with a central axis of the inner ring is 40° or more and 50° or less.

2. The double row tapered roller bearing according to claim 1, wherein a main shaft connected to a blade passes through and is fixed to the inner ring in a wind turbine generator, and the outer ring is fixed to a housing, thereby rotatably supporting the main shaft with respect to the housing.

3. A double row tapered roller bearing comprising:

an outer ring serving as a bearing ring having an annular shape;

an inner ring disposed on an inner circumferential side of the outer ring and serving as a bearing ring having an annular shape, the inner ring including two inner ring members, each having an outer circumferential surface facing the outer ring and having a row of grooves having a bottom surface serving as a raceway surface; and tapered rollers disposed in the grooves of each of the inner ring members in contact with the raceway surface of that inner ring and being also in contact with the outer ring, at the outer circumferential surface of each of the inner ring members of the inner ring, a region adjacent to the groove including a hardened region extending from an inner peripheral surface of the groove to the region adjacent to the groove, and an unhardened region located at a position farther from the groove than the hardened region and being smaller in hardness than the hardened region, the inner ring being constituted of steel containing at least 0.43 mass % and not more than 0.65 mass % of carbon, at least 0.15 mass % and not more than 0.35 mass % of silicon, at least 0.60 mass % and not more than 1.10 mass % of manganese, at least 0.30 mass % and not more than 1.20 mass % of chromium, at least 0.15 mass % and not more than 0.75 mass % of molybdenum, and at least 0.35 mass % and not more than 0.75 mass % of nickel with the rest consisting of iron and an impurity, wherein an angle that the raceway surface of the grooves of each of the inner ring members forms with a central axis of the inner ring is 40° or more and 50° or less.

4. The double row tapered roller bearing according to claim 3 wherein a main shaft connected to a blade passes through and is fixed to the inner ring in a wind turbine generator, and the outer ring is fixed to a housing, thereby rotatably supporting the main shaft with respect to the housing.

* * * * *